United States Patent [19]
Baker et al.

[11] 3,767,293
[45] Oct. 23, 1973

[54] UNIQUE PRISMATIC ELEMENT AND MOUNTING ARRANGEMENT THEREFOR

[75] Inventors: Philip G. Baker, Peabody; William A. Holmes, Marblehead, both of Mass.

[73] Assignee: Polaroid Corporation, Cambridge, Mass.

[22] Filed: Jan. 3, 1972

[21] Appl. No.: 215,000

[52] U.S. Cl. ............... 352/78 R, 350/286, 350/287
[51] Int. Cl. ............................................. G03b 23/02
[58] Field of Search ................... 352/72, 78, 130, 352/113; 350/286, 287, 241, 252; 95/42

[56] References Cited
UNITED STATES PATENTS

| | | | |
|---|---|---|---|
| 2,443,390 | 6/1948 | Kingston | 350/178 X |
| 2,553,329 | 5/1951 | Perkins | 350/287 |
| 2,708,136 | 5/1955 | Norris | 350/287 X |
| 2,762,932 | 9/1956 | Falge et al. | 350/287 |
| 3,582,216 | 6/1971 | Edwards | 350/287 |
| 3,615,127 | 10/1971 | Land | 352/130 X |
| 3,627,407 | 12/1971 | Cook | 352/130 X |

FOREIGN PATENTS OR APPLICATIONS

| | | | |
|---|---|---|---|
| 192,762 | 12/1907 | Germany | 350/287 |
| 95,489 | 4/1939 | Sweden | 350/287 |
| 171,458 | 5/1960 | Sweden | 350/287 |

*Primary Examiner*—Samuel S. Matthews
*Assistant Examiner*—Alan Mathews
*Attorney*—Charles Mikulka et al.

[57] ABSTRACT

The combination of a prism with integrally formed mounting ears and a mounting station into which the prism and its ears are placed. Once positioned, part of the mounting station is bent to secure the prism into its predetermined location. The mounting station retains the prism through its ears and not through any optical surface. Accordingly, all three optical surfaces of the prism are left unencumbered for more efficient cooling.

23 Claims, 3 Drawing Figures

PATENTED OCT 23 1973 3,767,293

UNIQUE PRISMATIC ELEMENT AND MOUNTING ARRANGEMENT THEREFOR

In the present few years the motion picture film industry has produced motion picture cameras which are used in conjunction with a relatively small and compact film cassette. More recently, there have been developed film cassettes which employ an illumination system in which light from a projector lamp enters the film cassette at a right angle to the direction of film movement during projection. A film handling cassette of this type is shown and described in a copending application for U.S. Pat. entitled "A Novel Prismatic Element" by Philip G. Baker Ser. No. (Our Case No. 4421) filed simultaneously herewith and assigned to the same assignee of the present application. In order to achieve proper film illumination and projection, a light bending element must be positioned between the projection lamp and the film. This light bending element causes a 90° redirection of the illumination from the projector lamp to the exposed film. More recently, however, right angle prisms have been employed for redirecting the light from the projection lamp to the film. Depending upon their specific configuration, the prisms used are generally made of either glass or plastic. When plastic is used, however, the prism's proximity to the projection lamp results in possible melting and optical variation to the prismatic element. One solution which may be employed in avoiding prism melting is the use of a controlled air cooling system which is operative during film projection. Cool air is continuously circulated within the confines of the film cassette in order to cool the prism and various other components included within the film cassette. A film cassette cooling system of this type is shown and described in a copending application for U.S. Pat., entitled "Motion Picture Film System with Multi-Purpose Film Cassette," Ser. No. (Our Case No. 4130) by William A. Holmes and John R. Sharp, filed simultaneously herewith and assigned to the assignee of the present application.

The cooling system noted above can be more effectively employed when a maximized external face area of the prism is exposed to the air flow. As a result, the prism mounting within the film cassette should be designed such that the air cooling system can reach every part of the prism.

SUMMARY OF THE INVENTION

The present invention is addressed to a unique light reflecting prismatic element and a mounting arrangement therefor. The prismatic element has integrally formed mounting ears by which the prism is mounted within a mounting station. The mounting ears are configured as a pair of accurately formed extensions of the lateral sides of the prism and are adapted to fit within a complementarily shaped recess contained within the mounting station. The mounting station is fixedly attached in its proper position within the interior of a film cassette. Once the prism and its mounting ears have been placed within the mounting station, a portion of the station is bent or staked over the ears to secure the prism into a fixed operable position. The mounting station retains the prism by the integrally formed ears and not by any prism optical surface. Accordingly, the three optical surfaces of the prism are unencumbered and may be more easily cooled in order to prevent melting.

The use of the mounting station and ears results in other advantages apart from cooling considerations. Specifically, the prism ears provide a very convenient non-optical extension through which plastic may be injected. In injection molding there frequently exists a phenomenom best defined as swirling. The plastic, when cooled, exhibits swirling patterns within the element which, in the case of an optical prism, are optically undesirable. These patterns are especially noticeable at the entrance of the injection molding. Therefore, as extensions, the mounting ears provide a dislocated area through which molding may be introduced without adversely affecting the optical properties of the prismatic element per se.

Another advantage to be gained through the use of the mounting ears is the ease and simplicity of correctly locating and positioning the prism within the cassette. Additionally, the mounting ears of the prism afford a simplified type of insulation between the relatively hot prism and the temperature intolerant mounting station. If the ears were not present, heat conduction could develop to a point at which the mounting station would tend to distort or disfigure due to the heat generated by the projection system.

One object and feature of the present invention is to provide a mounting station for an optical prism with mounting extensions which retain the prism without encumbering any of the prism's optical surfaces.

Another object and feature of the present invention is to provide an optical prism with lateral mounting ears and a mounting station for retaining the prism through its mounting ears, the mounting station and mounting ears being so configured as to increase the surface area of the prism which may be cooled by an air flow system.

Still another object and feature of the present invention is to provide an easily manufactured and inexpensive mounting arrangement for an optical prism which is both simple and efficient.

Another object and feature of the present invention is to provide an optical prism which is manufactured through an injection molding process, the prism containing an injection molding pin separate from its optical surfaces for localizing possible swirling from without the optical part of the prism.

A further object and feature of the present invention is to provide a mounting arrangement for use with an optical prism which is easily manufactured and which provides a mounting platform without recourse to sophisticated manufacturing tolerance components.

Still another object and feature of the present invention is to provide a mounting arrangement for an optical prism, the prism providing insulation between the prism and a mounting station for preventing melting or distortion to the mounting station when the prism is subjected to high temperatures.

Other objects and features of the invention will in part be obvious and will in part appear hereinafter.

The invention accordingly comprises the apparatus possessing features, tenchiques, and properties which are exemplified in the description to follow hereinafter.

For a fuller understanding of the nature and objects of the invention, reference should be made to the following detailed description taken in connection with the accompanying drawings.

DETAILED DESCRIPTION OF THE DRAWINGS

Figure 1:
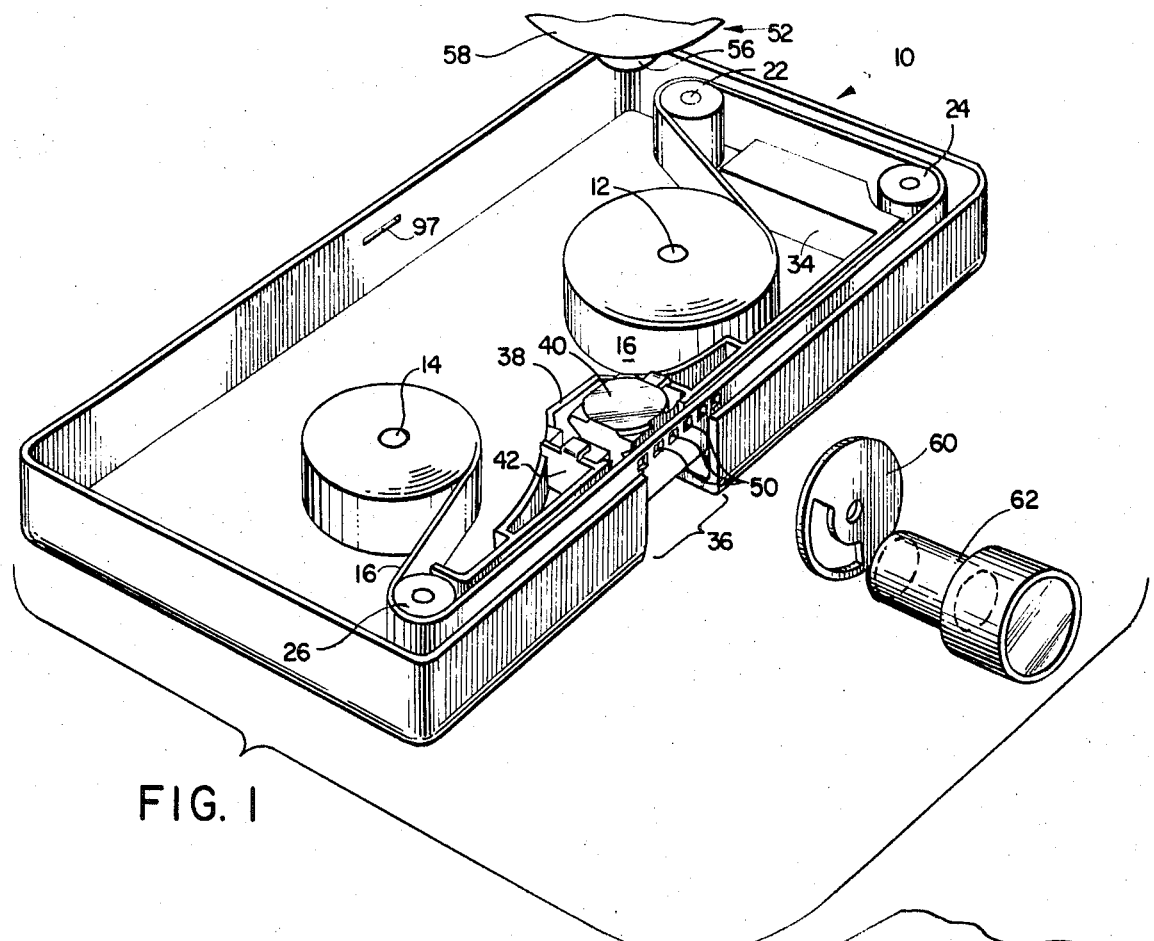
FIG. 1 is a diagrammatic perspective view of a motion picture film system including a compact multipurpose cassette mounted in a projector and embodying features of this invention.

Referring to FIG. 1, there is shown a cassette structure 10 into which the present invention is incorporated. Cassette 10 includes a supply reel 12 and a take-up reel 14. Attached to each of these reels 12 and 14 are the respective ends of a strip of motion picture film 16. Strip 16 passes from supply reel 12 to a series of idlers 22, 24, and 26. Positioned in close proximity with idler 24 is a container 34 of viscous development composition suitable for developing latent images recorded on film strip 16 during exposure. Suitable means (not shown) are included within chamber 34 for applying the viscous development composition upon film strip 16 subsequent to exposure.

Cassette 10 is also provided with a film aperture 36 across which film strip 16 passes in traveling between idlers 24 and 26. Located in alignment with film aperture 36, and immediately behind film strip 16, is a pressure plate (not shown) which correctly positions film strip 16 for purposes of exposure and projection. The pressure plate includes an aperture formed therein through which a photographic image is passed for projecting the film strip 16. Provided behind film aperture 36 film strip 16, and the pressure plate is a recess 38 in which is permanently mounted a prismatic element 40. Disposed behind film aperture 36 and around the built-in prismatic element 40 is a baffle member 42 which extends partially around idler 26 and around idler 24 toward the idler 22 to prevent light from penetrating the interior of the cassette's structure itself.

Cassette 10 is initially furnished with most of the film strip 16 in its photosensitive state coiled on a supply reel 12. For exposure purposes, the cassette 10 is mounted within an appropriate camera (not shown) with the take-up reel 14 engaged by suitable drive means (not shown) of the camera. In this use the film aperture 36 serves as an exposure station through which images are directed by the camera lens (not shown) through a camera shutter (not shown) onto the photosensitive film 16 in its passage from the supply reel 12 to the take-up reel 14. During the exposure sequence, the viscous development composition in container 34 is not emitted. Film 16 is drawn onto the take-up reel 14 by power supplied thereto from the camera and is advanced past the film aperture 36 in incremental steps by a typical claw mechanism (not shown) cooperating with sprocket holes 50 appropriately provided in the film strip 16.

An illumination system 52 provided in a projector shown generally at 54 consists basically of a lamp 56 and a condenser or reflector 58. Condenser 58 directs a cone of converging light into a portion of prismatic element 40 positioned in the recess 38 of cassette 10. The converging beam of light from illumination system 52 is redirected by prismatic element 40 through the film strip 16, through a shutter mechanism 60 of projector 54 and into a projection lens 62 located at its focal point.

For a fuller explanation of the exposure and processing operations employed within cassette 10, reference should be made to U.S. Pat. No. 3,615,127 issued Oct. 26, 1971, in the name of Edwin H. Land and the above identified being assigned to the assignee of the present invention. However, as previously indicated, the present invention is directed to a unique prism configuration and the advantageous embodiment of such a prism in a compact multipurpose film handling cassette. Consequently, many details of the cassette's structure per se do not constitute a part of the present invention and may obviously take forms other than those shown herein.

Figure 2:
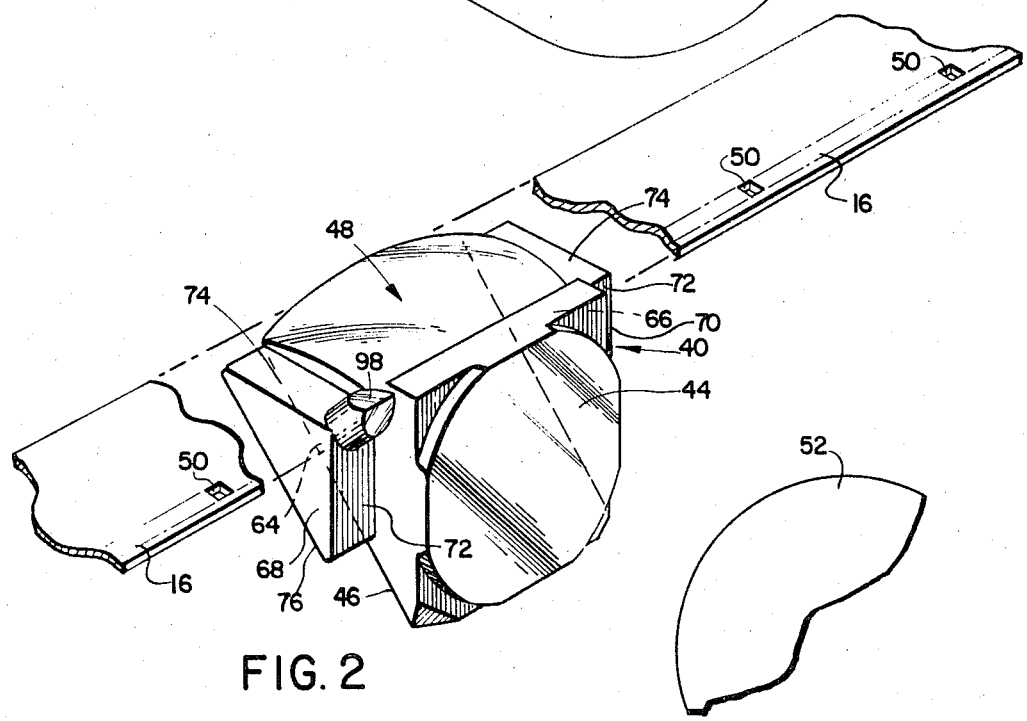
FIG. 2 is a perspective view of a preferred embodiment of a prismatic element mounted within the cassette of FIG. 1.

A detailed configuration of the prismatic element 40 is shown in FIG. 2 of the drawings. In its preferred form it includes a light-receiving first transparent planar face 44. A flat reflecting surface 46 is angularly disposed behind the light-receiving transparent face 44 and redirects light entering prismatic element 40 outwardly through a second transparent face 48, which is partially convex in nature, onto the film strip 16 and thence through the film aperture 36. Prismatic element 40 is additionally composed of two lateral side surfaces 64 and 66. Disposed on each of the lateral side surfaces 64 and 66 is an integrally formed ear extension 68 and 70, respectively.

For a more detailed description of the optical elements and features of prism 40, reference should be made to a copending application, Ser. No. (our Case No. 4421) entitled "A Novel Prismatic Element" by Philip G. Baker filed simultaneously herewith and assigned to the assignee of the present invention.

Figure 3:
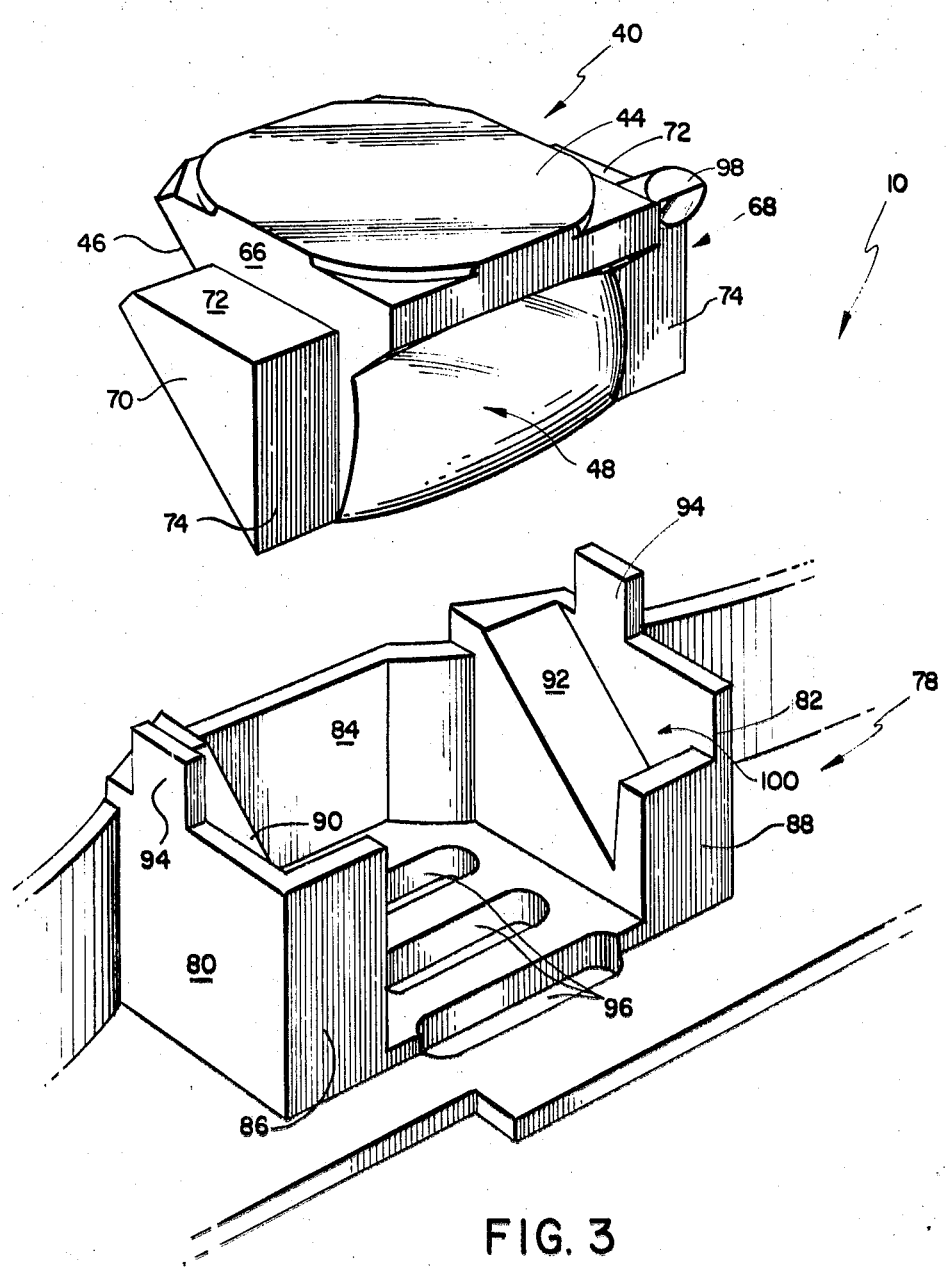
FIG. 3 is a perspective view of the mounting arrangement of the present invention.

Reference is now made to FIG. 3 in which prism 40 and its mounting station are shown in more elaborate detail. In the preferred embodiment shown, ears 68 and 70 are configured having a generally triangular shape. Ears 68 and 70 have a top planar surface 72, a vertical planar surface 74 and an angled surface 76 connecting surface 72 to surface 74. Top planar surfaces 72 of ear extensions 68 and 70 define a plane which is below the surface of first transparent face 44. Likewise, vertical planar surfaces 74 are recessed behind the forwardmost portion of second transparent face 48. Angled surfaces 76, however, are in the same plane as that established by flat reflective surface 46 for reasons which will become more apparent below.

Prism 40, along with its ear extensions 68 and 70, is mounted within a mounting station shown generally at 78 positioned within recess 38 of cassette 40. Mounting station 78 is fixedly attached to the bottom portion of cassette 10 and may be formed as an integral part thereof. Cassette 10 and mounting station 78 are formed as a unitary element in an injection molding process. In the preferred embodiment shown, the bottom portion of mounting station 78 contains a pair of side wall structures 80 and 82, a rear wall 84 and partial front wall extensions 86 and 88 of side walls 80 and 82, respectively. Located on the interior of side walls 80 and 82 are two ramped surfaces 90 and 92, respectively. Ramped surfaces 90 and 92 extend between rear wall 84 to the interior of front walls 86 and 88. Front wall 88 is of a smaller height than is wall 86 for purposes which will be discussed below.

A pair of wall extensions 94 are integrally formed as a part of side walls 80 and 82 and are positioned rearwardly from the centers of walls 80 and 82. A group of three air vents 96 are located within the bottom portion of cassette 10 with their interior openings positioned within the confines of the above described wall structure of mounting station 78.

During the assembly of film handling cassette 10, prism 40 is placed within mounting station 78 as is shown by the dashed lines of FIG. 3. When properly seated, the angled surfaces 76 of ear extensions 68 and 70 are in abutting contact with ramped surfaces 92 and 90, respectively. Vertical planar surfaces 74 abut against the interior of front walls 86 and 88, thereby limiting the forward movement of prism 40. Additionally, top surfaces 72 of ear extensions 68 and 70 are flush with the tops of side walls 82 and 80, respectively. Positioned as described, wall extensions 94 are heat staked such that they lie over top surfaces 72. It should be noted in this regard that mounting station 78 is constructed of plastic, or the like, and is therefore subject to the heat staking process described above. When wall extensions 94 are staked or bent over, prism 40 is secured within mounting station 78 in its operable position.

Proper positioning of prism 40 in its operable position is accomplished by accurately forming ramped surfaces 90 and 92 along with angled surfaces 76 of ear extensions 68 and 70. In the preferred embodiment shown, ramped surfaces 90 and 92 are oriented at a 45° angle with respect to the bottom portion of cassette 10. Likewise, angled surfaces 76 of ear extensions 68 and 70 are oriented at a 45 decree angle with respect to first transparent face 44. Therefore, when prism 40 is properly seated, surface 44 is parallel to the bottom portion of cassette 10, and a tangent to convex portion 48 of prism 40 is positioned substantially perpendicular to the bottom portion noted above. Configured as such, mounting station 78, in conjunction with ear extensions 68 and 70, provides an easily formed and inexpensive mounting arrangement into which prism 40 is placed for properly locating prism 40 within cassette 10 without recourse to sophisticated manufacturing components having low manufacturing tolerances.

Located at the junction of top surface 72 and vertical surface 74 of ear extension 68 is a pin extension 98 integrally formed therewith. Pin extension 98 serves a dual function in both the manufacture and seating of prism 40. Specifically, when prism 40 is seated within mounting station 78, pin 98 extends through a cutout portion 100 of front wall 88. As noted previously, front wall 88 is formed with a smaller height than is front wall 86. It should be apparent to those skilled in the art that, as configured, pin 98 prevents any other orientation of prism 40 in mounting station 78 other than the correct one shown in FIG. 3.

Pin 98, in addition to preventing misorientation of prism 40, also serves as a convenient location for the introduction of the injection molding process by which prism 40 and ears 68 and 70 are manufactured. Formed as the point of application of the molding process, pin 98 provides an entrance which is dislocated from the optical surfaces of prism 40 and therefore localizes an undesirable phenomenon known in the art as swirling. Swirling, although a function of various factors, is in part dependent upon the point of application of the injection molding process. To a large degree most swirling occurs at the entrance hole of a mold due to vortical patterns set up during the flow of the liquid to be molded. Pin 98, which is removed from the optical surfaces of prism 40, localizes the swirling effect to within the ear extension 68 and pin 98. Accordingly, a large part of the swirling pattern is removed from the optical portion of prism 40 and instead is confined to the non-optical ear extension 68 and pin 98. Moreover, any flashing that exists after molding is not present on a surface (i.e. surfaces 72, 74 or 76) which is used for correctly locating and positioning the prism 40, and accordingly, does not have to be removed.

Mounting station 78 and ear extensions 68 and 70 of prism 40 also function as a mounting arrangement for permitting a more efficient flow of air around a prism 40 for cooling purposes. The three air vents 96 provide an input for cooling air when cassette 10 is mounted within projector 54. Typical of the illumination system 52 discussed above is the DNF halogen lamp 150 QTB/LVD marketed by the Photolamp Products Division, Sylvania Electric Products, Inc. of Salem, Massachusetts. The above noted lamp is employed within the preferred embodiment of the present invention for effectively illuminating a high density film such as film 16. Film 16 is of a high density due to its having a superimposed and integrally formed positive-negative structure. A film of this type is described in a U.S. Pat. to Lucretia J. Weed, No. 3,615,429 issued Oct. 26, 1971 and assigned to the assignee of the present application. Due to the relatively high output of lamp 52 there is an appreciable amount of heat produced which is directed toward prism 40 by reflector 58. Moreover, the lamp 52 is located a small distance (approximately 1⅛ inches) from prism 40, which, in addition to the high output of lamp 52, results in a high heat concentration (up to 200° F.) at the various surfaces of prism 40. As prism 40 is formed of molded plastic, i.e. a clear plastic material such as Plexiglass V–1001, there is a possibility that prism 40 will optically distort or melt. Accordingly, an air flow system is provided for cooling prism 40. The three air flow vents 96 provide an air inlet for the air cooling system. Air is passed into cassette 10 through vents 96 and exits through an exit vent 97 located on the rear wall of cassette 10. Although operative to cool other components of cassette 10, the air cooling system is primarily operative to cool prism 40. For a fuller understanding of the operation and features of the air cooling system, reference should be made to a copending application Ser. No. (our Case No. 4130) entitled "Motion Picture Film System with Multipurpose Film Cassette," by William A. Holmes and John R. Sharp filed simultaneously herewith and assigned to the assignee of the present application.

The mounting arrangement for prism 40 is configured so as to leave all of the prism's optical surfaces unencumbered. Note that when prism 40 is properly secured, first transparent surface 44, reflective surface 46 and second transparent face 48 are all free to be cooled by the air flow system. A conventional mounting system, wherein prism 40 is mounted to a surface by reflective surface 46, would not permit the necessary air flow to surface 46 and would lead to the undesirable consequences mentioned above.

Another advantage to be derived from the present mounting arrangement also relates to the heating problem mentioned above. Specifically, mounting station 78 is formed of plastic or the like. If ear extensions 68 and 70 were not present, and prism 40 was mounted by its lateral sides 64 and 66, there exits the possibility that the heat concentration within prism 40 would be conducted therethrough and into the mounting station 78.

Should this be permitted, the mounting station 78 (which has a lower resistance to heat than does prism 40) would be disformed and result in an optical misalignment of prism 40. Accordingly, by providing the prism 40 with ear extensions 68 and 70, an insulating material exists between prism 40 and mounting station 78 and the heat disformation of station 78 is alleviated.

In view of the foregoing, it will be appreciated that the employment of the mounting arrangement of the present invention provides a convenient and easily formed mounting for an optical prism which leaves the prism's optical surfaces unencumbered so that they may be more easily cooled. The mounting arrangement described herein also provides a convenient insulation between the prism per se and its mounting station for preventing heat deformation to the mounting station. Additionally, the specific configuration of the ear extensions and pin 98 provides for an entrance for the introduction of the injection molding process for alleviating the optically undesirable phenomenon of swirling within the prism per se.

This invention may be practiced or embodied in still other ways without departing from the spirit and essential character thereof. Therefore, the preferred embodiment described above is merely illustrative and not restrictive, the scope of the invention being indicated by the accompanying claims.

What is claimed is:

1. In combination with a compact motion picture film handling cassette, a product for use in photographic projection operations when mounted in receiving means including support surfaces, comprising:
a light reflecting prismatic element having a pair of light transparent optical faces, a single reflective face and two lateral faces extending substantially perpendicular to at least one of said pair of light transparent optical faces, and means for cooperating with said receiving means for mounting and aligning said product in its operative position within said cassette, said mounting and aligning means comprising a pair of ear extensions extending from said lateral faces of said prismatic element and having at least a portion thereof complementarily configured with respect to said supporting surfaces, said ear extensions being positioned and constructed so as to provide means for holding said prismatic element without interferring with the entrance and exit of light into and out of the optical faces of said prismatic element.

2. The combination of claim 1 in which said light transparent optical faces and said mounting and aligning means comprise an integral unitary member.

3. The combination of claim 2 in which said integral unitary member is formed of plastic.

4. The combination of claim 1 in which said supporting surfaces define at least one V-shaped recess and said prismatic element portion is complementarily V-shaped.

5. In combination, a compact motion picture film handling cassette and a mounting station for a light reflecting prismatic element having a pair of light transparent optical faces, two non-optical lateral faces extending substantially perpendicular to at least one of said pair of light transparent optical faces, and mounting means therefore, said mounting means including a pair of ear extensions extending from the non-optical lateral faces of said prismatic element and extending beyond said optical faces having at least a portion thereof defining supporting surfaces, said mounting station including receiving means for mounting and aligning said prismatic element in its operative position, said receiving means including support surfaces complementarily configured with respect to said supporting surfaces of said prismatic element.

6. The combination of claim 5 in which said receiving means are formed of a plastic material and include an integrally formed extension configured to be deformed over a portion of said prismatic element to secure said prismatic element in said mounting station.

7. The combination of claim 5 in which said support surfaces thereof define a V-shaped recess.

8. The combination of claim 7 in which said prismatic element is complementarily V-shaped with respect to said support surfaces.

9. Motion picture film handling cassette comprising a film strip, means for storing said film strip, a light reflecting prismatic element including a light reflecting surface and mounting means therefor, said light reflecting prismatic element mounting means including extension means extending from two non-optical lateral faces of said light reflecting prismatic element beyond said light reflecting surface having at least a portion thereof defining supporting surfaces, a mounting station including receiving means for mounting and aligning said light reflecting prismatic element in its operative position with respect to said film strip, said receiving means including support surfaces complementarily configured with respect to said support surfaces of said light reflecting prismatic element, said mounting station including tab means selectively deformable over a portion of said extension means when said light reflecting prismatic element is placed within said mounting station for securing said prismatic element within said mounting station.

10. The motion picture film handling cassette of claim 9 in which mounting station includes cut-away portions of a similar size and shape as said ears for providing a base into which said ears are placed.

11. The motion picture film handling cassette of claim 10 in which said light reflecting prismatic element is a prism comprising:
a first transparent face for permitting light to enter said prism;
a reflective surface angularly disposed with respect to said first transparent face for reflectively redirecting said light entering said first transparent face;
a second face, partially convex in nature through which said redirected light is exited through said prism; and
two lateral faces, said extension means being formed as an integral part of said two lateral faces, said extension means being positioned and constructed so as to provide means for holding said prism without interfering with said entrance and exit of said light into and out of said prism.

12. The motion picture film handling cassette of claim 11 in which said extension means have a generally triangular shape.

13. The motion picture film handling cassette of claim 12 in which said mounting station is formed having correspondingly formed triangular shaped cut-away portions into which said extension means are placed, said extension means and said cut-away portions of said mounting station being oriented so as to correctly position said prism in its operable position.

14. The motion picture film handling cassette of claim 13 in which said mounting station and said extension means are operative to retain said prism in its said operable position by a non-optical surface of said prism, said extension means and said mounting station being oriented so as to maximize the surface area of said prism which may be cooled.

15. The motion picture film handling cassette of claim 14 in which said extension means are formed having a size which is compatable with providing an insulation between said prism and said mounting station for insulating said mounting station from heat generated in and around said prism, whereby said mounting station is prevented from distorting due to heat from said prism.

16. The motion picture film handling cassette of claim 15 in which said prism is formed by the injection molding of plastic.

17. The motion picture film handling cassette of claim 16 in which at least one of said extension means is formed having an extending pin means, said extending pin means providing an optically dislocated area into which said injection molding may be introduced for alleviating swirling within said prism.

18. The motion picture film handling cassette of claim 17 in which said mounting station comprises:
    side wall structures having cut-away portions for receiving said extension means of said prism;
    a rear wall structure; and
    front wall structures connected to said side wall structures, one of said front wall structures having a cut-out portion for accepting said pin extension of said prism, said cut-out portion and said pin extension being configured for properly positioning said prism at its said operable position within said mounting station and being further configured for preventing any other positioning of said prism within said mounting station.

19. The motion picture film handling cassette of claim 18 in which said tab means are integrally formed as part of said side wall structures, said tab means being deformable over a portion of said extension means for securing said prism wihtin said mounting station.

20. The motion picture film handling cassette of claim 19 in which said extension means comprise:
    a top surface having a plane substantially parallel to said prism's first transparent face;
    a vertical surface having a plane perpendicular to said top surface and positioned behind the plane established by said second face; and
    a slanted surface connecting said top surface to said vertical surface, said slanted surface being in the same plane established by said reflective surface for providing an accurate positioning element for correctly positioning said prism without recourse to sophisticated manufacturing components.

21. The motion picture film handling cassette of claim 20 in which said tab means is deformable over a portion of said top surface for retaining said prism within said mounting station.

22. The motion picture film handling cassette of claim 18 in which said side wall structures of said mounting station are operative to correctly locate said prism laterally within said mounting station.

23. The motion picture film handling cassette of claim 18 in which said front wall structures are operative to correctly locate said prism forwardly within said mounting station.

* * * * *